United States Patent
Petela et al.

(10) Patent No.: US 8,790,602 B2
(45) Date of Patent: Jul. 29, 2014

(54) FURNACE COIL WITH PROTUBERANCES ON THE EXTERNAL SURFACE

(75) Inventors: Grazyna Petela, Calgary (CA); Leslie Wilfred Benum, Red Deer (CA)

(73) Assignee: Nova Chemicals (International) S. A., Fribourg (CH)

( * ) Notice: Subject to any disclaimer, the term of this patent is extended or adjusted under 35 U.S.C. 154(b) by 245 days.

(21) Appl. No.: 13/432,192

(22) Filed: Mar. 28, 2012

(65) Prior Publication Data

US 2012/0275966 A1 Nov. 1, 2012

(30) Foreign Application Priority Data

Apr. 28, 2011 (CA) ...................................... 2738273

(51) Int. Cl.
| | | |
|---|---|---|
| *B01J 19/00* | (2006.01) | |
| *C07C 4/02* | (2006.01) | |
| *C10G 9/20* | (2006.01) | |
| *B01J 19/24* | (2006.01) | |
| *B01J 19/02* | (2006.01) | |

(52) U.S. Cl.
CPC *C10G 9/20* (2013.01); *C10G 9/203* (2013.01); *B01J 19/2415* (2013.01); *B01J 19/0013* (2013.01); *B01J 19/02* (2013.01); *B01J 2219/00087* (2013.01); *C10G 2300/1044* (2013.01); *C10G 2300/1081* (2013.01); *C10G 2400/20* (2013.01); *Y10S 585/92* (2013.01); *Y10S 585/922* (2013.01); *Y10S 585/924* (2013.01); *Y10S 585/925* (2013.01); *Y10S 585/926* (2013.01)
USPC ........... 422/659; 422/240; 422/198; 585/636; 585/920; 585/922; 585/924; 585/925; 585/926

(58) Field of Classification Search
CPC .................. C10G 9/203; B01J 2219/00087
USPC ........... 422/659; 585/636, 920, 922, 924–926
See application file for complete search history.

(56) References Cited

U.S. PATENT DOCUMENTS

| | | | |
|---|---|---|---|
| 3,205,048 A * | 9/1965 | Elsner et al. .................. | 422/641 |
| 4,232,728 A | 11/1980 | Fenner et al. | |
| 4,402,359 A | 9/1983 | Camavos et al. | |
| 5,590,711 A | 1/1997 | Ishida et al. | |
| 5,950,718 A | 9/1999 | Sugitani et al. | |
| 7,096,931 B2 | 8/2006 | Chang et al. | |
| 7,128,139 B2 | 10/2006 | Oballa et al. | |
| 7,386,980 B2 | 6/2008 | Green et al. | |
| 2010/0143206 A1 * | 6/2010 | Hashimoto ................... | 422/129 |

OTHER PUBLICATIONS

Detemmerman et al, Three Dimensional Coupled Simulation of Furnaces and Reactor Tubes for the Thermal Cracking of Hydrocarbons, Rev IFP, vol. 53 No. 2, Mar.-Apr. 1998, p. 181-194.
Saegher et al, Three Dimensional Simulation of High Severity Internally Finned Cracking Coils . . . , Universiteit Gent, Lab voor Petrochernische Tech, cir. 1998, 16 pgs.

* cited by examiner

*Primary Examiner* — Lessanework Seifu
(74) *Attorney, Agent, or Firm* — Kenneth H Johnson

(57) ABSTRACT

The efficiency of heat transfer to a furnace tube or coil in a furnace for cracking ethane, propane or naphtha feedstocks, or a mixture thereof may be improved by providing protuberances on the surface of the tube or coil having i) a maximum height from 3 to 15% of the coil outer diameter, ii) a contact surface with a coil, or a base, which area is 0.1%-10% of the coil external cross section area, and iii) a geometrical shape which has a relatively large external surface containing a relatively small volume.

21 Claims, 5 Drawing Sheets

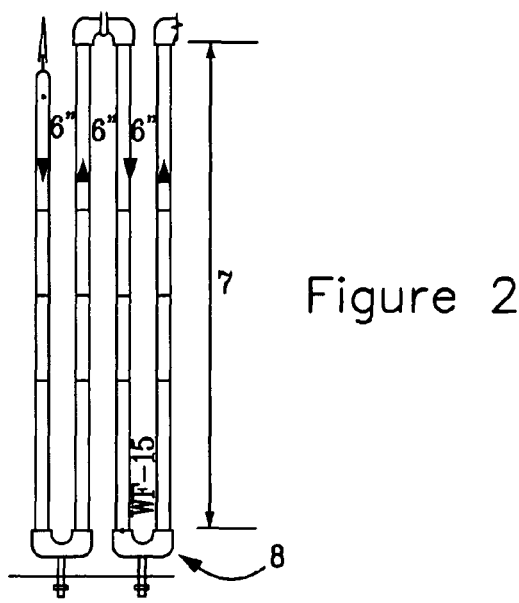
Figure 2
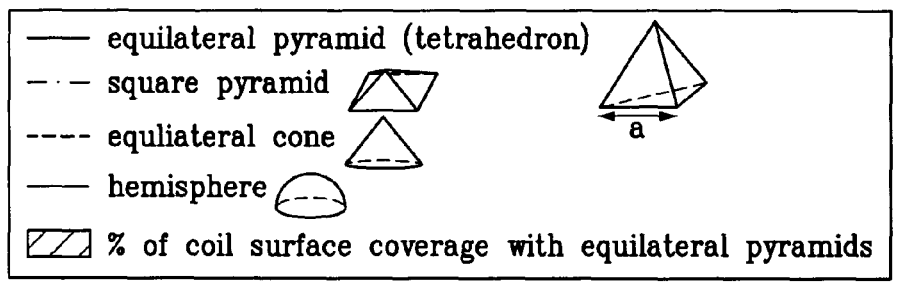
Effect of protuberances on increase of coil external surface; (protuberance weight ~ 30% weight of a bare coil)
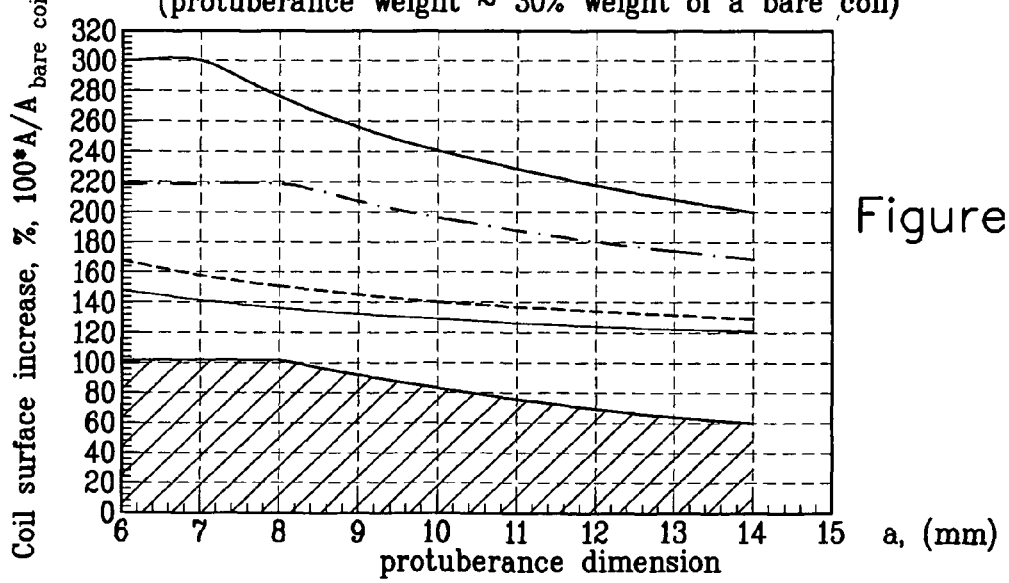
Figure 3

FURNACE COIL WITH PROTUBERANCES ON THE EXTERNAL SURFACE

FIELD OF THE INVENTION

The present invention relates to the field of cracking paraffins to olefins and more particularly to protuberances on the external surface of the vertical portion of process coil(s) in the radiant section of a cracking furnace. More particularly, the protuberances may be pyramids, cubes, cones, arcs through a sphere (e.g. hemispherical or less) or teardrop shaped, but the preferential shapes are those with a large external surface containing a small volume. The protuberances can be spaced apart in a regular pattern, or their density per square inch can differ along the coil and can depend on the exposure of the coil to local radiation intensity in a furnace. A size of a single protuberance should be such that its base (a contact surface with a coil) should not exceed 10% of the coil cross section, and its height should not exceed 15% of the coil internal diameter.

These protuberances increase net transfer of radiant and convective heat from flame, combustion gases and surrounding furnace walls, into the external surface of the process coil.

BACKGROUND OF THE INVENTION

The field of heat exchanger designs is replete with applications of fins to improve the heat transfer. Typically this is heat transfer by forced convection mechanism. The heat transfer by forced convection takes place between a solid surface and fluid in motion, which may be gas or liquid, and it comprises the combined effects of conduction and fluid flow. This type of heat transfer occurs in most of the conventional heating systems, either hot water or electric and industrial heat exchangers.

In the cracking process of a paraffin such as ethane or naphtha, the feed flows through a furnace coil (pipe) that is heated up to 1050° C., inside the radiant section of a cracking furnace. At these temperatures, the feed undergoes a number of reactions, including a free radical decomposition (cracking), reformation of a new unsaturated product and the coproduction of hydrogen. These reactions occur over a very short period of time that corresponds to the feed residence time in a coil.

The interior of the radiant section of the furnace, is lined with heat absorbing/radiating refractory, and is heated typically by gas fired burners. The heat transfer within the furnace, between flame, combustion gases, refractory and the process coils is mostly by radiation, and also by forced convection.

There is a drive to improve the efficiency of cracking furnaces as this reduces process costs and green house gas emissions. There have been two main approaches to improving efficiency; improving heat transfer to the furnace coils, i.e. from flame, combustion gases and refractory walls to the external surface of a process coil, and improving heat transfer within the coil, i.e. from the coil walls into the feed flowing inside the coil.

One of the methods representing the second approach, is the addition of internal fins to the inner walls of the furnace coil, to promote the "swirling" or mixing of the feed within the coil. This improves the convective heat transfer from the coil walls to the feed as the turbulence of the feed flow is increased and the heat transferring surface of the hot inner wall of the coil is increased as well.

U.S. Pat. No. 5,950,718 issued Sep. 14, 1999 to Sugitani et al., assigned to Kubota Corporation provides one example of this type of technology.

The papers "Three dimensional coupled simulation of furnaces and reactor tubes for the thermal cracking of hydrocarbons", by T. Detemmerman, G. F. Froment, (Universiteit Gent, Krijgslaan 281, b9000 Gent—Belgium, mars-avri, 1998); and "Three dimensional simulation of high internally finned cracking coils for olefins production severity", by Jjo de Saegher, T. Detemmerman, G. F. Froment, (Universiteit Gent1, Laboratorium voor Petrochemische Techniek, Krijgslaan 281, b-9000 Gent, Belgium, 1998 provide a theoretical simulation of a cracking process in a coil which is internally finned with helicoidal and longitudinal fins (or rather ridges or bumps). The simulation results are verified by lab scale experiments, where hot air flows through such internally finned tubes. The papers conclude that the tube with internal helicoidal fins performs better then with internal longitudinal fins and that the results for "a tube with internal helicoidal fins are in excellent agreement with industrial observations". However, no experimental data are provided to support these conclusions. There is also no comparison made to the performance of a bare tube, with no internal ribs or fins. The authors agree that one potential disadvantage of such coils with internal fins is that carbon deposits may build up on the fins, increasing the pressure drop through the tube.

The addition of fins to a coil external surface are taught as well in the prior art. U.S. Pat. No. 5,590,711 issued Jan. 7, 1997 to Ishida et al., assigned to Kabushiki Kasha Kobe Seiko Sho, discloses heat exchanger tubes having a plurality of external crests and ridges on their surface. The tubes are used in refrigeration and air conditioning applications, in which a liquid (e.g. water) is in direct contact with the external surface of the tube. The patent does not suggest the tubes could be used in a radiant section of a cracking furnace.

U.S. Pat. No. 7,096,931 issued Aug. 29, 2006 to Chang et al., assigned to ExxonMobil Research and Engineering Company teaches an externally finned heat exchanger tube in a slurry reaction (Fischer Tropsch synthesis). In the reaction, a slurry of CO and hydrogen in a hydrocarbyl diluent containing catalyst, flows over heat exchanger. tubes containing flowing cooling water. The water is heated to steam in the process, to remove the heat of reaction.

Both of the preceding patents teach heat exchange by forced convection. That is a flowing fluid (water or, a hydrocarbon) is in contact with the external surface of a heating/cooling tube which has groves or fins on its surface. Neither of the patents suggests external protuberances to enhance the radiative heat transfer to the tube.

NOVA Chemicals U.S. Pat. No. 7,128,139 issued Oct. 31, 2006 teaches external annular fins on the cracking furnace coil to increase convection heat exchange to the coil.

Canadian Patent application 2,746,285 titled Furnace Coil Fins filed Jun. 29, 2011, in the name of NOVA Chemicals discloses longitudinal fins on the passes of a furnace tube. This does not suggest protuberances of the present invention.

U.S. Pat. No. 4,402,359 issued Sep. 6, 1983 to Carnavos et al., assigned to Noranda Mines Limited, discloses a heat transfer device having an augmented wall surface that comprises a base wall of heat conductive material having plurality of pyramid fins, regularly spaced apart and formed as a knurled diamond pattern around the outside periphery of the pipe. However, the fins are of a very small size of 0.015-0.040 inch, and their primary purpose was to enhance the convective heat transfer from a flowing liquid into a solid surface.

U.S. Pat. No. 4,232,728 issued Nov. 11, 1980 to Fenner et al., assigned to Union Carbide discloses a metal tube for a heat exchanger, with enhanced heat transfer capabilities that has an inner surface provided with a layer of randomly distributed irregular metal bodies or particles bonded to the inner surface and spaced from each other. The ratio of the arithmetic average height of these bodies or particles to the tube inner diameter is at least 0.006.

U.S. Pat. No. 7,386,980 issued Jun. 17, 2008 to Green et al., assigned to Power Systems Mfg LLC discloses a combustion liner having enhanced heat transfer, which has substantially uniform pattern comprising a plurality of intersecting grooves textured into its cooling surface. The texture can be also shapes as e.g. frustums of pyramids, with heights 0.01 inches.

All the above references teach away from the subject matter of the present invention as the surface modifications are geometrically very small so they represent rather grooves or material "texture", and they were designed to increased convective heat transfer between fluids, primarily in heat exchangers.

The present invention seeks to provide a method to increase the net radiant and convective heat capture by a process coil in the radiant heating section of a cracking furnace.

SUMMARY OF THE INVENTION

The present invention provides an improvement in a furnace for thermally cracking a feed selected from the group consisting of $C_{2-4}$ alkanes, and naphtha, the improvement comprising using in the furnace radiant section one or more process coils comprising one or more passes, having the external surface augmented with plurality of low profile protuberances, said protuberances having:

i) geometrical shape, having a relatively large external surface that contains a relatively small volume, (such as e.g. tetrahedrons, pyramids, cubes, cones, etc.);

ii) a maximum height from 3.0% to 15% of the coil outer diameter;

iii) a base area, which is a surface in contact with a coil, that should not exceed 0.1%-10% of the coil outer cross section area.

In a further embodiment the protuberance has a maximum height from 3% to 10% of the coil outer diameter, In a further embodiment the shape of the protuberance is a tetrahedron (pyramid with a triangular base and 3 faces that are equilateral triangles).

In a further embodiment the shape of the protuberance is a Johnson square pyramid (pyramid with a square base and sides which are equilateral triangles).

In a further embodiment the shape of the protuberance is a pyramid with 4 isosceles triangle sides.

In a further embodiment the shape of the protuberance is any pyramid with isosceles triangle sides.

In a further embodiment the shape of the protuberance is a section of a sphere.

In a further embodiment the shape of the protuberance is a section of an ellipsoid.

In a further embodiment the shape of the protuberance is a section of a tear drop (a non uniformly deformed ellipsoid).

In a further embodiment only selected passes of the furnace coil in the radiant section have protuberances.

In a further embodiment, the protuberance bases cover the entire surface of the coil, without any spaces left between them, (unless a protuberance base has a shape, e.g. spherical, that does allow for a complete coverage of a coil surface).

In a further embodiment, the protuberances are spaced apart on the coil external surface in a regular pattern, with the same density (number of protuberances per square inch).

In a further embodiment protuberances are spaced apart on the coil external surface in a regular pattern, but their density per square inch can differ along the coil and can depend on the exposure of the coil to a local radiation intensity in a furnace.

In a further embodiment the protuberances are preferably cast or machined as integral parts of the coil (so they comprise the same material composition as the coil).

In a further embodiment the furnace radiant coil comprises from about 55 to 65 weight % of Ni; from about 20 to 10 weight % of Cr; from about 20 to 10 weight % of Co; and from about 5 to 9 weight % of Fe and the balance one or more of the trace elements.

In a further embodiment wherein the trace elements in the above coil comprise from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

In a further embodiment the furnace radiant coil comprises from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

In a further embodiment the trace elements in the above coil comprise from 0.2 up to 3 weight % of Mn; from 0.3 to 2 weight % of Si; less than 5 weight % of titanium, niobium and all other trace metals; and carbon in an amount of less than 0.75 weight %

In a further embodiment the furnace radiant coil comprises from 20 to 38 weight % of chromium from 25 to 48, weight % of Ni.

In a further embodiment the above radiant coil further comprises from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

BRIEF DESCRIPTION OF THE DRAWINGS

FIG. 2 is a schematic drawing of a part of a process coil.

FIG. 3 is a graph showing the increase in the external surface of tube with protuberances, depending on protuberance geometry, dimensions and density of tube surface coverage.

DETAILED DESCRIPTION

Figure 1:
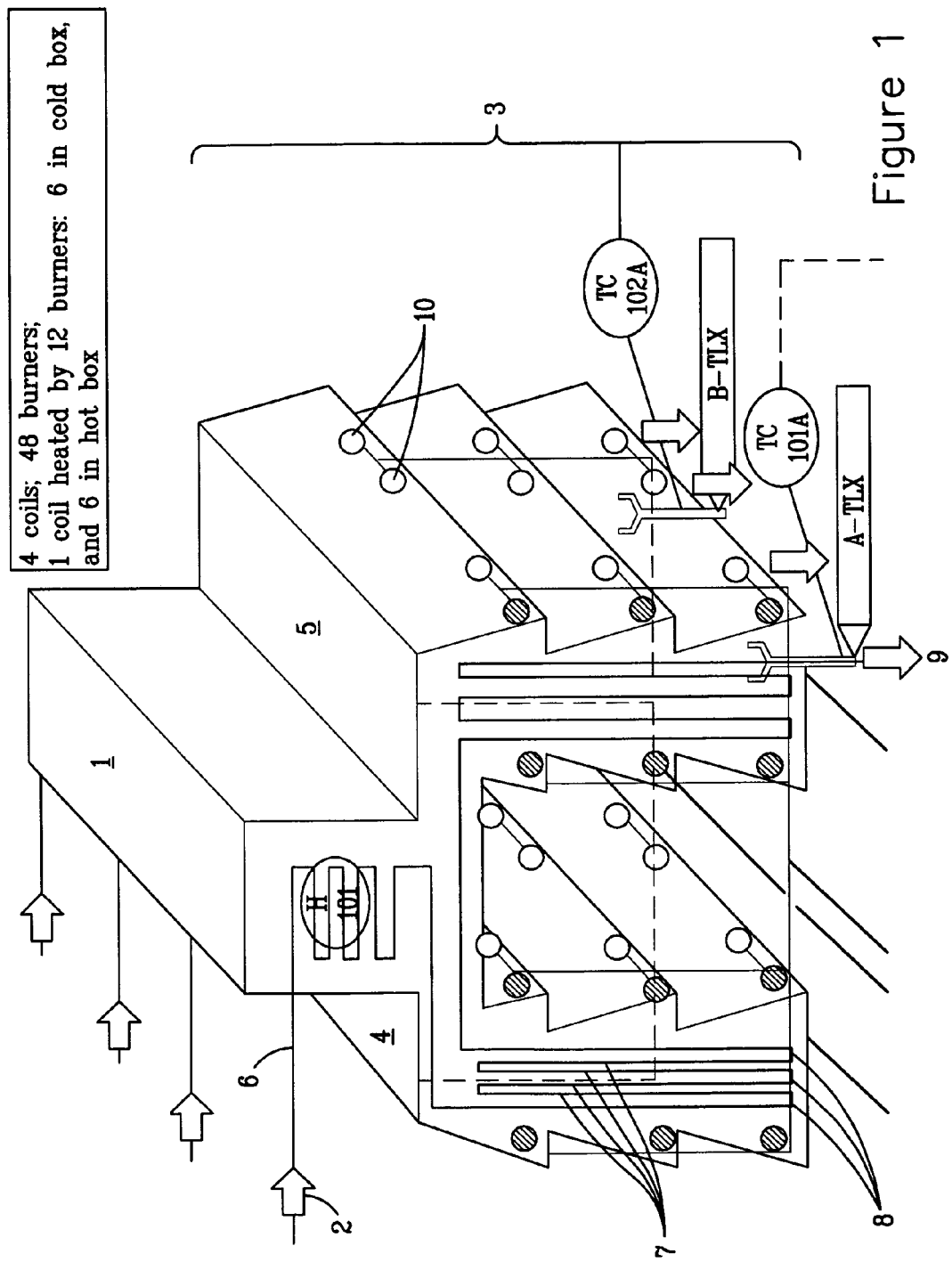
FIG. 1 is a schematic drawing of a cracking furnace.

In the manufacture of ethylene, a feed typically selected from the group consisting of $C_{2-4}$ alkanes, and naphtha is fed into one or more furnace coils which pass through a cracking furnace. The furnace, schematically shown in FIG. 1, includes two main parts: the convection section (1) where the feed (2) is initially preheated, and the radiant section (3) where the actual cracking process takes place. The radiant section of the furnace comprises the inlet (4), located downstream of the convection section which accounts for about half of the furnace radiant section and is sometimes referred to as a "cold" box, and the outlet (5) referred to as "hot" box. The feed flows through the process coil (6) which includes a long tube (7), suspended inside the inlet (4) and outlet (5) radiant sections of the furnace. To increase the length of the coil and, thus, to allow for the adequate residence time of the feed inside both radiant parts of the furnace, the coil comprises multiple vertical straight tubes (7), referred to as "passes", inter-connected with U-shaped elbows (8), as shown in FIG. 2. As the feed flows through the coil passes in the inlet radiant furnace section (4), ("cold" box), it is heated approximately to the temperature at which cracking reactions begin. Next, the feed leaves the inlet radiant section and flows through the passes of the process coils in the furnace outlet radiant section (5) ("hot" box). In this section, the feed is further heated, the cracking reaction is progressing, until the final products (8) are extracted from the coil exit. In both parts of the furnace radiant section, the feed is heated by flames and by combustion gases generated by the burners (9) which are mounted on the furnace walls and on the furnace bottom. Heat transfer from combustion gases and flames to the processing coil (6) occurs predominantly by radiation and also, to a lesser extent, by the mechanism of forced convection. Flame and combustion gases heat not only the coils but also the furnace walls. The walls which are lined with a heat absorbing/radiating refractory, radiate heat on the coil, thus contributing to heating process of the flowing feed (2) as well.

If the efficiency of the heat transfer to the process coil in a furnace radiant section is maximized or just increased, fuel consumption by the burners can be reduced and, consequently, so are green house gas emissions reduced. The increased efficiency of heat transfer in the radiant section provides also another possibility, such that the fuel consumption can be kept unchanged, but furnace capacity can be increased, i.e. higher feed flow rates can be cracked in the coil.

In accordance with the present invention, the external surface of the coil, at least in a portion of one or more passes (7) in the cracking furnace radiant section, is augmented with relatively small protuberances.

The protuberances may be evenly spaced along the pass or unevenly spaced along the pass. The proximity of the protuberances to each other may change along the length of the pass or the protuberances may be evenly spaced but only on portions of the tube, or both. The protuberances may be more concentrated at the upper end of the pass in the radiant section of the furnace.

The protuberances can cover from 10% to 100% (and all ranges in between) of the external surface of the coil pass (7). In some embodiments of the invention, the protuberances may cover from 40 to 100%, typically from 50% to 100%, generally from 70% to 100% of the external surface of the pass of the radiant coil. If protuberances do not cover the entire coil pass, but cover less than 100% of the pass, they can be located at the bottom, middle or top of the pass (7).

A protuberance base is in contact with the external coil surface. A base of a protuberance has an area not larger than 0.1%-10% of the coil cross sectional area. The protuberance may have geometrical shape, having a relatively large external surface that contains a relatively small volume, such as for example tetrahedrons, pyramids, cubes, cones, a section through a sphere (e.g. hemispherical or less), a section through an ellipsoid, a section through a deformed ellipsoid (e.g. a tear drop) etc. Some useful shapes for a protuberance include:

a tetrahedron (pyramid with a triangular base and 3 faces that are equilateral triangles);

a Johnson square pyramid (pyramid with a square base and sides which are equilateral triangles);

a pyramid with 4 isosceles triangle sides;

a pyramid with isosceles triangle sides (e.g. if t is a four faced pyramid the base may not be a square it could be a rectangle or a parallelogram);

a section of a sphere (e.g. a hemi sphere or less);

a section of an ellipsoid (e.g. a section through the shape or volume formed when an ellipse is rotated through its major or minor axis); and a section of a tear drop (e.g. a section through the shape or volume formed when a non uniformly deformed ellipsoid is rotated along the axis of deformation);

a section of a parabola (e.g. section though the shape or volume formed when a parabola is rotated about its major axis—a deformed hemi—(or less) sphere), such as e.g. different types of delta-wings.

The selection of the shape of the protuberance is largely based on the ease of manufacturing the pass or tube. One method for forming protuberances on the pass is by casting in a mold having the shape of the protuberance in the mold wall. This is effective for relative simple shapes. The protuberances may also be produced by machining the external surface of a cast tube such as by the use of knurling device for example a knurl roll.

The above shapes are closed solids.

The size of the protuberance must be carefully selected. The smaller the size, the higher is the surface to volume ratio of a protuberance, but it may be more difficult to cast or machine such a texture. In addition, in the case of excessively small protuberances, the benefit of their presence may become gradually reduced with time due to settlement of different impurities on the coil surface. However, the protuberances need not be ideally symmetrical. For example an elliptical base could be deformed to a tear drop shape, and if so shaped preferably the "tail" may point down when the pass is positioned in the furnace.

A protuberance may have a height ($L_z$) above the surface of the radiant coil from 3% to 15% of the coil outer diameter, and all the ranges in between, preferably from 3% to 10% of the coil outer diameter.

In one embodiment the concentration of the protuberances is uniform and covers completely the coil external surface. However, the concentration may also be selected based on the radiation flux at the location of the coil pass (7) (e.g. some locations may have a higher flux than others—corners).

In designing the protuberances care must be taken so that they adsorb more radiant energy than they may radiate. This may be restated as the transfer of heat through the base of the protuberance into the coil must exceed that transferred to the equivalent surface on a bare finless coil at the same operational conditions. If the concentrations of the protuberances become excessive and if their geometry is not selected properly, they may start to reduce heat transfer, due to thermal effects of excessive conductive resistance, which defeats the purpose of the invention. The properly designed and manufactured protuberances will increase net radiative and convective heat transferred to a coil from surrounding flowing combustion gasses, flame and furnace refractory. Their positive impact on radiative heat transfer is not only because more heat can be absorbed through the increased coil external surface so the contact area between combustion gases and coil is increased, but also because the relative heat loss through the radiating coil surface is reduced, as the coil surface is not smooth any more. Accordingly, as a protuberance radiates energy to its surroundings, part of this energy is delivered to and captured by other protuberances, thus it is re-directed back to the coil surface. The protuberances will also increase the convective heat transfer to a coil, due to increase in coil external surface that is in contact with flowing combustion gas, but also by increasing turbulence along the coil surface and by reducing the thickness of a boundary layer.

The protuberances may comprise up to 10% to 35% of the weight of the coil pass (7). One of the limiting issues to consider is the creep of the coil pass (7) given the additional weight of the protuberances. This may also affect the location and concentration of the protuberances. It may reduce creep if there more protuberances on the upper surface of the pass. Preferably, the protuberances are an integral part of the coil pass and may be formed by casting or machining a cast tube. As a result, preferably, the protuberance material has the same composition as the material of the pass (7) of the radiant coil. Obviously cost will be a consideration in the selection of the shape of the protuberance and its method of production.

The pass of the coil may be a tube of a stainless steel which may be selected from the group consisting of wrought stainless, austentic stainless steel and HP, HT, HU, HW and HX stainless steel, heat resistant steel, and nickel based alloys. The coil pass may be a high strength low alloy steel (HSLA); high strength structural steel or ultra high strength steel. The classification and composition of such steels are known to those skilled in the art.

In one embodiment the stainless steel, preferably heat resistant stainless steel typically comprises from 13 to 50, preferably 20 to 50, most preferably from 20 to 38 weight % of chromium. The stainless steel may further comprise from 20 to 50, preferably from 25 to 50 most preferably from 25 to 48, desirably from about 30 to 45 weight % of Ni. The balance of the stainless steel may be substantially iron.

The present invention may also be used with nickel and/or cobalt based extreme austentic high temperature alloys (HTAs). Typically the alloys comprise a major amount of nickel or cobalt. Typically the high temperature nickel based alloys comprise from about 50 to 70, preferably from about 55 to 65 weight % of Ni; from about 20 to 10 weight % of Cr; from about 20 to 10 weight % of Co; and from about 5 to 9 weight % of Fe and the balance one or more of the trace elements noted below to bring the composition up to 100 weight %. Typically the high temperature cobalt based alloys comprise from 40 to 65 weight % of Co; from 15 to 20 weight % of Cr; from 20 to 13 weight % of Ni; less than 4 weight % of Fe and the balance one or more trace elements as set out below and up to 20 weight % of W. The sum of the components adding up to 100 weight %.

In some embodiments of the invention the steel may further comprise a number of trace elements including at least 0.2 weight %, up to 3 weight % typically 1.0 weight %, up to 2.5 weight % preferably not more than 2 weight % of manganese; from 0.3 to 2, preferably 0.8 to 1.6 typically less than 1.9 weight % of Si; less than 3, typically less than 2 weight % of titanium, niobium (typically less than 2.0, preferably less than 1.5 weight % of niobium) and all other trace metals; and carbon in an amount of less than 2.0 weight %. The trace elements are present in amounts so that the composition of the steel totals 100 weight %.

The present invention will now be illustrated by the following non limiting examples.

Example 1

Validation of the Model of the Radiant Section of the Cracking Furnace

Figure 4:
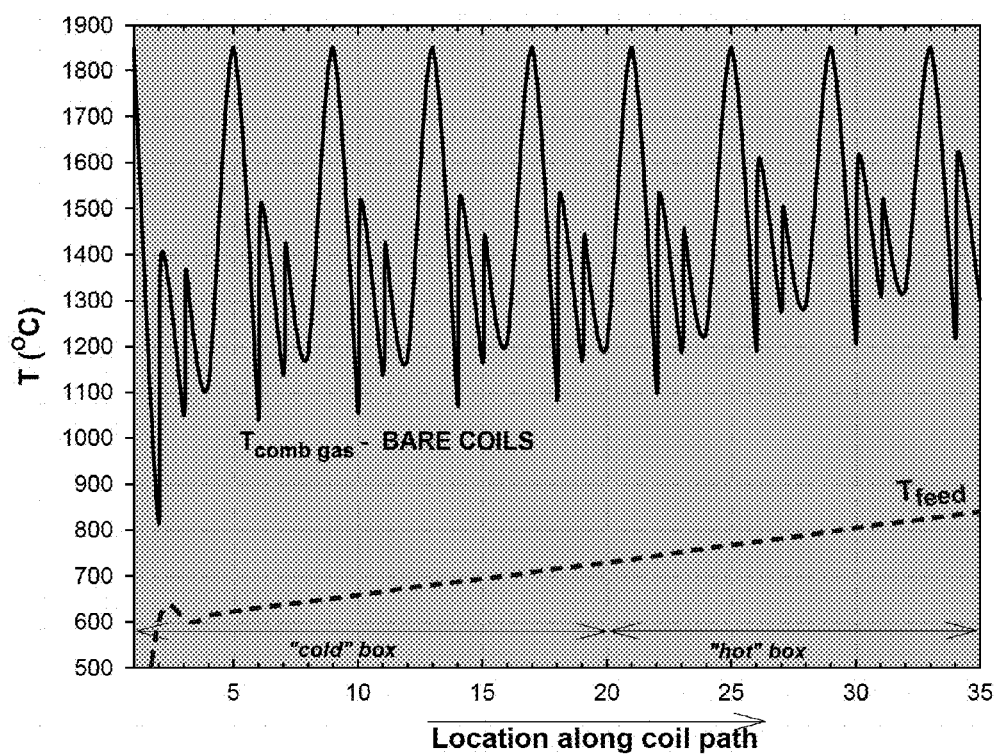
FIG. 4 is a plot of the calculated temperature distribution of combustion gases and feed, along the bare finless coils in a radiant furnace section, based on the computer simulation results obtained using the furnace model described in example 1.
Figure 5:
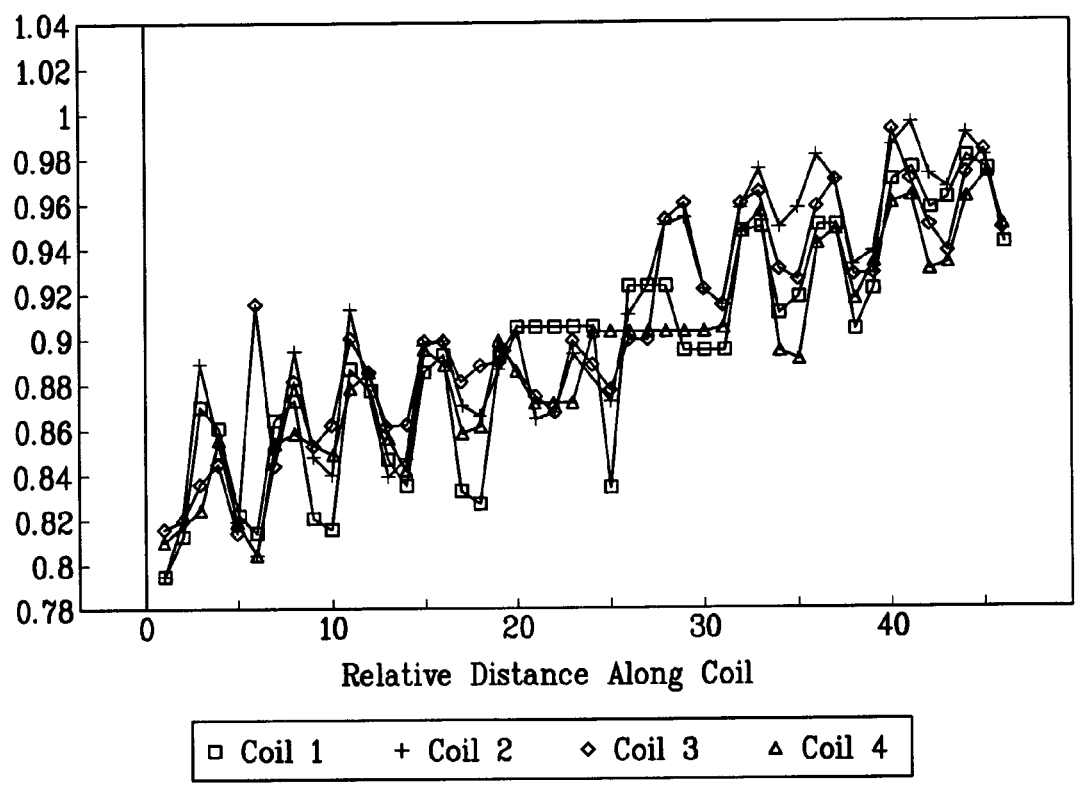
FIG. 5 is the actual temperature profile of the external surface of bare finless coils, measured in the radiant section of the cracking furnace, that was operated with the similar parameters as used in the simulation in example 1.

A computer model of the radiant section of the NOVA Chemicals ethane cracker at Joffre was developed. The model was written using TK Solver (release 4) by Universal Technical System Inc. The model was run to simulate the process in the cracking furnace in which the coils in the furnace radiant section had no fins. The model predicted the temperature of the combustion gases, which flow along the process coils and transfer heat to the coil's external surface in the furnace radiant section, while heating the feed in the coil to the desired temperature levels. The results are shown in FIG. 4. The input data used for the above simulation, such as specific geometry and dimensions of the furnace and of the coils, feed flow rate, fuel gas composition and flow rate into the burners, feed and product compositions and temperatures at the inlet and outlet of the furnace radiant section, etc, were the actual operating data measured in a cracking furnace in Joffre. The calculated combustion gas temperatures were compared to the measured temperatures of the coil external surface, which are shown in FIG. 5. There was good qualitative agreement between the calculated combustion gas temperatures and the measured coil surface temperatures, so the model validly represents the operation of the furnace radiant section.

Example 2

Figure 6:
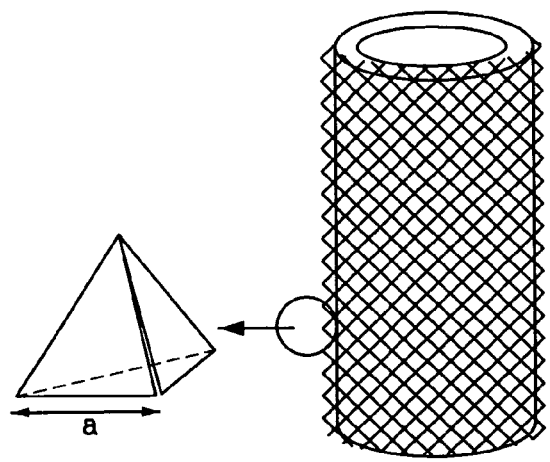
FIG. 6 shows a coil with the external surface augmented with protuberances in the shape of equilateral pyramids, (tetrahedrons), with the side "a=7 mm".

Comparison of the Fuel Consumption and Efficiency of a Furnace which is Equipped with a) the bare radiant process coils (without protuberances);
b) the radiant coil having the external surface covered with protuberances shaped as equilateral pyramids, as shown in FIG. 6;

To have the basis for comparison between efficiency and performance of the radiant process coils representing both above geometries, the following assumptions were made for the simulations purpose:

Two sizes of protuberances were considered: equilateral pyramids with side dimension of (i) a=7 mm, and (ii) a=11 mm, which were, evenly distributed along the entire length of the coils and covered ~100% of the coil external surface and ~65% of the coil external surface, respectively, (% of the surface coil coverage depends on the shape and size of a protuberant, and is shown in FIG. 3).

The total mass of protuberances was kept equal to 30% weight of a bare coil. This approach was taken because a significant limiting factor in the design of coils with augmented surfaces is the additional mass of augmentations. Increasing their dimensions and mass, may improve the coil efficiency but it will also increase a coil tendency towards creep.

The dimensions of bare radiant coils (diameter, wall thickness, length) were identical in the simulations of both the above cases (i.e. finless bare coils and coils with protuberances), and they were equal to the actual dimensions of finless coils, currently installed in Joffre cracking furnaces.

Figure 7:
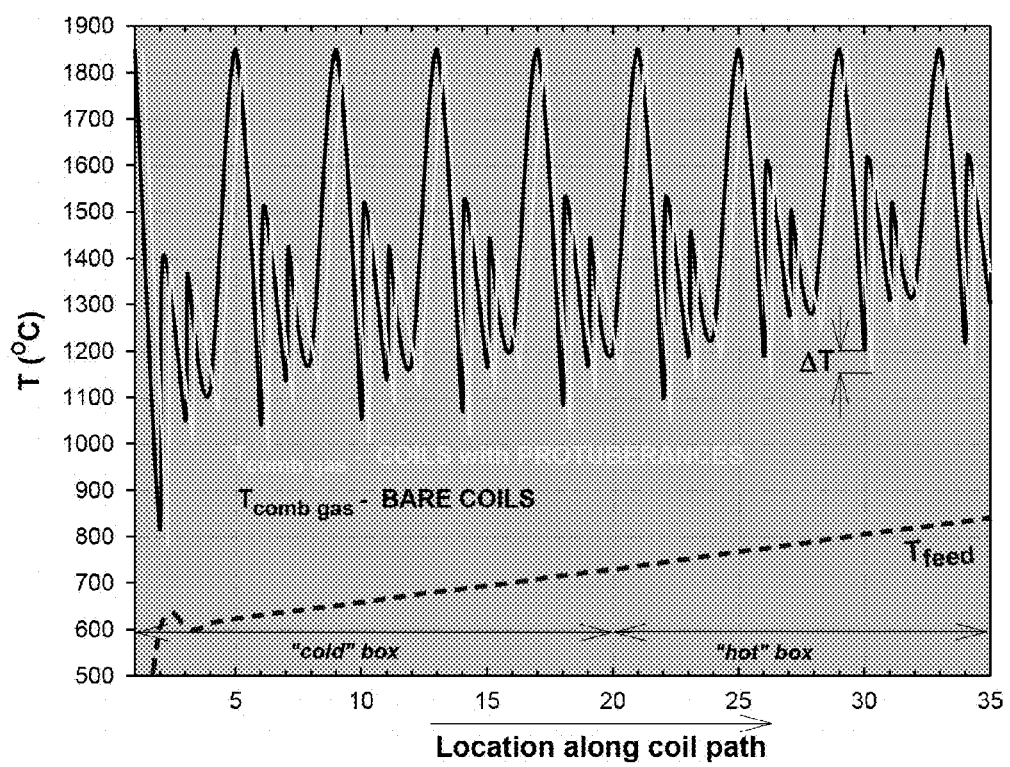
FIG. 7 is the graph comparing the calculated temperature distributions of combustion gases (and feed) along: i) the bare finless process coils, as was already shown in FIG. 4, and ii) the coils with external surface covered with the above protuberances in shape of equilateral pyramids, (a=7 mm).

The obtained simulations results are shown in FIG. 7, and they indicate that addition of protuberances improves heat transfer as compared to the case when process coils are bare finless tubes. The coils with augmented external surface absorb more heat from combustion gases and, as the result, the temperature of combustion gases along the coil path decreases to lower levels, as compared to the temperature of gases transferring heat to the bare coils. This effect of more efficient "cooling" of combustion gases by coils with protuberances is represented in FIG. 7 by the difference Δt in combustion gas temperatures in both compared cases.

When the size of protuberances was increased from 7 mm to 11 mm, while their mass remained unchanged, the larger protuberances covered only about 65% of the coil surface. As a consequence, the efficiency of the coil performance did not improve but became even slightly lower.

Due to more effective heat absorption by the coils with augmented external surface, temperature of the coil external surface increased as well, and in the last coil segments it became unacceptably high. Therefore, the feed rate through a coil had to be increased, to utilize the excess of heat transferred to the coil and to help "cool down" the coil surface to the acceptable temperature level. To process/crack the increased feed flow rate required to maintain the required coil temperature limit, fuel gas supply has to be increased as well above the level which was consumed in the furnace operating with bare coils. Therefore, the application of the coils with augmented external surface resulted in increase of furnace capacity; increase of fuel consumption and in increase of the overall efficiency of the furnace radiant section.

The simulation results which quantify the above effects are set forth in Table 1.

| Operational Parameters | BARE coils in the radiant furnace section (Reference) | Coils with PROTUBERANCES (in the shape of equilateral pyramids. with a side dimension "a") | |
|---|---|---|---|
| | | a = 7 mm | a = 11 mm |
| Protuberances/coil mass ratio, % | 0 | 30 | 30 |
| Fuel supply to furnace burners, kg/s | 0.504 | 0.603 | 0.600 |
| Feed supply to the furnace coil, kg/s | 0.898 | 1.142 | 1.130 |
| Efficiency of furnace radiant section, % | 54.4 | 58.0 | 57.7 |

What is claimed is:

1. In a furnace for thermally cracking a feed selected from the group consisting of $C_{2-4}$ alkanes, and naphtha, the improvement comprising using in the furnace radiant section one or more process coils comprising one or more passes, having the external surface augmented with protuberances, the said protuberances having:
   i) a maximum height from 3 to 15% of the coil outer diameter;
   ii) a contact surface with a coil, or a base, which area is 0.1%-10% of the coil external cross section area;
   iii) a geometrical shape which has a relatively large external surface containing a relatively small volume.

2. The furnace according to claim 1, wherein the protuberances have a maximum height from 3% to 10% of the coil outer diameter.

3. The furnace according to claim 2, wherein, the furnace radiant coil comprises from about 55 to 65 weight % of Ni; from about 20 to 10 weight % of Cr; from about 20 to 10 weight % of Co; and from about 5 to 9 weight % of Fe and the balance one or more of the trace elements.

4. The furnace according to claim 3, wherein the furnace radiant coil further comprises from 0.2 up to 3 weight % of Mn; from 0.3 to 2 weight % of Si; less than 5 weight % of titanium, niobium and all other trace metals; and carbon in an amount of less than 0.75 weight % the sum of the components adding up to 100 weight %.

5. The furnace according to claim 2, wherein the furnace radiant coil comprises from 40 to 65 weight % of Co; from 15 to 20 weight % of Cr; from 20 to 13 weight % of Ni; less than 4 weight % of Fe and the balance of one or more trace elements and up to 20 weight % of W the sum of the components adding up to 100 weight %.

6. The furnace according to claim 5, wherein the furnace radiant coil further comprises from 0.2 up to 3 weight % of Mn; from 0.3 to 2 weight % of Si; less than 5 weight % of titanium, niobium and all other trace metals; and carbon in an amount of less than 0.75 weight %.

7. The furnace according to claim 2, wherein the furnace radiant coil comprises from 20 to 38 weight % of chromium from 25 to 48, weight % of Ni.

8. The furnace according to claim 7, wherein the furnace radiant coil further comprises from 0.2 up to 3 weight % of Mn, from 0.3 to 2 weight % of Si; less than 5 weight % of titanium, niobium and all other trace metals; and carbon in an amount of less than 0.75 weight % and the balance substantially iron.

9. The furnace according to claim 2, wherein the protuberances are pyramids.

10. The furnace according to claim 9, wherein the protuberances are pyramids with a triangular base.

11. The furnace according to claim 10, wherein the protuberances are tetrahedrons.

12. The furnace according to claim 9, wherein the protuberances are pyramids with a rectangular base.

13. The furnace according to claim 9, wherein the protuberances are pyramids with a square base.

14. The furnace according to claim 13, wherein the protuberances are Johnsons's pyramids.

15. The furnace according to claim 2, wherein the protuberances have a circular base.

16. The furnace according to claim 2, wherein the protuberances have an elliptical base.

17. The furnace according to claim 2, wherein the protuberances have a base which is a tear drop.

18. The furnace according to claim 2, wherein the protuberance bases covered the entire surface of the radiant coil.

19. The furnace according to claim 2, wherein the protuberance bases are spaced apart from each other on the external surface of the furnace coil.

20. The furnace according to claim 2, wherein the protuberances are spaced apart from each other, following a substantially uniform distribution pattern, about the external surface of the furnace coil.

21. The furnace according to claim 12, wherein only that portion of the furnace coil passes in the radiant section has protuberances.

* * * * *